(12) United States Patent
Christian et al.

(10) Patent No.: US 6,991,875 B2
(45) Date of Patent: Jan. 31, 2006

(54) ALKALINE BATTERY INCLUDING NICKEL OXYHYDROXIDE CATHODE AND ZINC ANODE

(75) Inventors: Paul A. Christian, Norton, MA (US); George Cintra, Holliston, MA (US); Richard E. Durkot, East Walpole, MA (US)

(73) Assignee: The Gillette Company, Boston, MA (US)

( * ) Notice: Subject to any disclaimer, the term of this patent is extended or adjusted under 35 U.S.C. 154(b) by 420 days.

(21) Appl. No.: 10/228,957

(22) Filed: Aug. 28, 2002

(65) Prior Publication Data
US 2004/0043292 A1    Mar. 4, 2004

(51) Int. Cl.
*H01M 4/32* (2006.01)
*H01M 4/52* (2006.01)
*H01M 4/42* (2006.01)

(52) U.S. Cl. .................. 429/223; 429/206; 429/229; 429/231.8; 429/232; 29/623.1

(58) Field of Classification Search ........... 429/223, 429/206, 229, 231.8, 232; 29/623.1
See application file for complete search history.

(56) References Cited

U.S. PATENT DOCUMENTS

| | | | |
|---|---|---|---|
| 3,436,267 A | 4/1969 | Faber | |
| 3,911,094 A | 10/1975 | Megahed et al. | |
| 4,074,030 A | 2/1978 | Ruben | |
| 4,224,392 A | 9/1980 | Oswin | |
| 4,481,128 A | 11/1984 | Jackovitz et al. | |
| 4,612,213 A | 9/1986 | Meunier | |
| 4,663,256 A | 5/1987 | Corrigan | |
| 4,844,999 A | 7/1989 | Oshitani et al. | |
| 5,451,475 A | 9/1995 | Ohta | |
| 5,489,314 A | 2/1996 | Bogauchi et al. | |
| 5,500,309 A | 3/1996 | Lichtenberg | |
| 5,626,988 A * | 5/1997 | Daniel-Ivad et al. | 429/229 |
| 5,744,266 A | 4/1998 | Nunome et al. | |
| 5,788,943 A | 8/1998 | Aladjov | |
| 5,827,494 A | 10/1998 | Yano et al. | |
| 6,020,088 A | 2/2000 | Singh | |
| 6,040,007 A | 3/2000 | Junichi et al. | |
| 6,110,620 A | 8/2000 | Singh et al. | |
| 6,193,871 B1 | 2/2001 | Coates et al. | |
| 6,210,833 B1 | 4/2001 | Bernard | |
| 6,235,428 B1 | 5/2001 | Yano et al. | |
| 6,251,538 B1 | 6/2001 | Seyama et al. | |
| 6,265,105 B1 * | 7/2001 | Tokuda et al. | 429/206 |
| 6,284,410 B1 | 9/2001 | Durkot | |
| 6,471,890 B2 | 10/2002 | Tanigawa et al. | |

(Continued)

FOREIGN PATENT DOCUMENTS

DE    3513119    10/1986

(Continued)

OTHER PUBLICATIONS

Megahed, S.A. et al., "Sealed Nickel-Zinc Cells Using Stable Nickelic Oxhydroxide Depolarizer," Proceedings of the Symposium on Battery Design and Optimization, held on Oct. 15-20, 1978, vol. 79-1, pp. 259-282, copyright 1979 by The Electrochemical Society, Incorporated.

*Primary Examiner*—Patrick Joseph Ryan
*Assistant Examiner*—Angela J. Martin
(74) *Attorney, Agent, or Firm*—Barry D. Josephs; Thomas G. Krivulka

(57) ABSTRACT

An alkaline battery includes a cathode including a nickel oxyhydroxide and an anode including zinc or zinc alloy particles.

29 Claims, 1 Drawing Sheet

U.S. PATENT DOCUMENTS

| | | | |
|---|---|---|---|
| 6,472,103 B1 | 10/2002 | Durkot | |
| 6,489,056 B1 | 12/2002 | Davis et al. | |
| 6,492,062 B1 | 12/2002 | Wang | |
| 6,521,378 B2 | 2/2003 | Durkot | |
| 6,566,009 B1 | 5/2003 | Noya et al. | |
| 6,617,072 B2 | 9/2003 | Venkatesan | |
| 6,686,091 B2 | 2/2004 | Yamamoto | |
| 2001/0031400 A1 | 10/2001 | Seyama et al. | |
| 2002/0034470 A1* | 3/2002 | Yamamoto et al. | 423/592 |
| 2002/0155352 A1* | 10/2002 | Durkot et al. | 429/229 |
| 2003/0054250 A1 | 3/2003 | Kweon et al. | |
| 2003/0068549 A1* | 4/2003 | Daniel-Ivad et al. | 429/212 |
| 2003/0134199 A1 | 7/2003 | Christian et al. | |
| 2003/0232247 A1 | 12/2003 | Loffler | |
| 2004/0115531 A1* | 6/2004 | Ueki et al. | 429/223 |
| 2004/0197656 A1* | 10/2004 | Durkot et al. | 429/229 |

FOREIGN PATENT DOCUMENTS

| | | |
|---|---|---|
| EP | 0899802 | 3/1999 |
| EP | 1148029 | 10/2001 |
| JP | 53-052954 | 5/1978 |
| JP | 54-004335 | 1/1979 |
| JP | 55-030133 | 3/1980 |
| JP | 56-015560 | 2/1981 |
| JP | 56-054759 | 5/1981 |
| JP | 56-155025 | 12/1981 |
| JP | 57-072266 | 5/1982 |
| JP | 57-182972 | 11/1982 |
| JP | 10-001317 | 1/1998 |
| JP | 2765029 | 6/1998 |
| JP | 10-223228 | 8/1998 |
| JP | 10-284075 | 10/1998 |
| JP | 10-316432 | 12/1998 |
| JP | 11-072877 | 3/1999 |
| JP | 11-195416 | 7/1999 |
| JP | 11-246226 | 9/1999 |
| JP | 2000-048827 | 2/2000 |
| JP | 2001-015106 | 1/2001 |
| JP | 2001-146431 | 5/2001 |
| JP | 2001-250538 | 9/2001 |
| JP | 2001-266868 | 9/2001 |
| JP | 2001-283843 | 10/2001 |
| JP | 2001-325954 | 11/2001 |
| JP | 2001-332249 | 11/2001 |
| JP | 2001-332250 | 11/2001 |
| JP | 2002-003223 | 1/2002 |
| JP | 2002-008650 | 1/2002 |
| JP | 2002-029754 | 1/2002 |
| JP | 2002-075354 | 3/2002 |
| JP | 2002-083599 | 3/2002 |
| JP | 2002-117859 | 4/2002 |
| JP | 2002-179427 | 6/2002 |
| JP | 2002-184401 | 6/2002 |
| JP | 2002-198060 | 7/2002 |
| JP | 2002-203546 | 7/2002 |
| JP | 2002-237286 | 8/2002 |
| JP | 2002-246018 | 8/2002 |
| JP | 2002-289187 | 10/2002 |
| JP | 2002-338252 | 11/2002 |
| JP | 2002-343327 | 11/2002 |
| JP | 2002-343346 | 11/2002 |
| JP | 2003-17011 | 1/2003 |
| JP | 2003-17042 | 1/2003 |
| JP | 2003-17043 | 1/2003 |
| JP | 2003-17044 | 1/2003 |
| JP | 2003-17077 | 1/2003 |
| JP | 2003-017077 | 1/2003 |
| JP | 2003-17079 | 1/2003 |
| JP | 2003-17080 | 1/2003 |
| JP | 2003-17081 | 1/2003 |
| JP | 2003-031213 | 1/2003 |
| JP | 2003-086163 | 3/2003 |
| JP | 2003-123745 | 4/2003 |
| JP | 2003-123746 | 4/2003 |
| JP | 2003-123747 | 4/2003 |
| JP | 2003-123762 | 4/2003 |
| JP | 2003197206 A | 7/2003 |
| JP | 2003272617 A | 9/2003 |
| WO | WO 00/21151 | 4/2000 |
| WO | WO 01/18897 | 3/2001 |
| WO | WO 01/86740 A2 | 11/2001 |
| WO | WO 02/013293 | 2/2002 |
| WO | WO 02/39534 | 5/2002 |
| WO | WO 02/41422 | 5/2002 |
| WO | WO 02/069420 | 9/2002 |
| WO | WO 03021698 | 3/2003 |
| WO | WO 03/090956 A1 | 11/2003 |
| WO | WO 2004/010513 A2 | 1/2004 |
| WO | WO 04025759 A1 | 3/2004 |

* cited by examiner

ALKALINE BATTERY INCLUDING NICKEL OXYHYDROXIDE CATHODE AND ZINC ANODE

TECHNICAL FIELD

This invention relates to an alkaline battery including a nickel oxyhydroxide cathode and a zinc anode and a method of manufacturing an alkaline battery.

BACKGROUND

Batteries, such as alkaline batteries, are commonly used as energy sources. Generally, alkaline batteries have a cathode, an anode, a separator and an alkaline electrolyte solution. The cathode can include a cathode material (e.g., manganese dioxide or nickel oxyhydroxide), carbon particles that enhance the electrical conductivity of the cathode, and a binder. The anode can be formed of a gel including zinc particles. The separator is disposed between the cathode and the anode. The alkaline electrolyte solution, which is dispersed throughout the battery, can be an aqueous hydroxide solution such as potassium hydroxide.

SUMMARY

In general, an alkaline battery includes a cathode, an anode, a separator between the anode and the cathode and alkaline electrolyte contacting the anode and the cathode. The cathode includes an active cathode material. The anode includes zinc. More specifically, the active cathode material includes a nickel oxyhydroxide and the anode includes zinc or zinc alloy particles. At least about 5 wt % of the zinc or zinc alloy particles are of –200 mesh size or smaller, or the anode includes a multi-modal distribution of zinc or zinc alloy particles.

In certain circumstances, the anode can includes at least 10 wt %, at least 15 wt %, at least 30 wt %, or between 35 and 75 wt % of the zinc or zinc alloy particles are of –200 mesh size or smaller. For example, at least about 10 wt %, at least 45 wt %, or at least 80 wt % of the zinc or zinc alloy particles can be of –325 mesh size or smaller. At least 25 wt %, for example at least 50 wt % of the zinc or zinc alloy particles are between about 20 and 200 mesh size. The zinc or zinc alloy particles can be generally acicular, having a length along a major axis at least two times a length along a minor axis, or the particles can be generally flake-like, each flake generally having a thickness of no more than about 20 percent of the maximum linear dimension of the particle.

The cathode can include carbon particles, which can be a conductive agent. More particularly, the cathode can include between 2 wt % and 12 wt %, or between 6 and 10 wt % of carbon particles. The carbon particles can include expanded graphite, natural graphite or a blend thereof. For example, the carbon particles can include from 10 to 90% by weight natural graphite. The carbon particles can include from 90 to 10% by weight expanded graphite.

In one aspect, an alkaline battery includes a cathode, an anode, a separator between the anode and the cathode and an alkaline electrolyte contacting the anode and the cathode. The cathode includes graphite and an active cathode material including a nickel oxyhydroxide. The anode includes zinc or zinc alloy particles, at least about 10 wt % of the zinc or zinc alloy particles being of –200 mesh size or smaller.

In another aspect, a method of improving discharge performance after high temperature storage of an alkaline battery includes providing a positive electrode including an active cathode material including nickel oxyhydroxide, providing a zinc electrode including zinc or zinc alloy particles, at least about 10 wt % of the zinc or zinc alloy particles being of –200 mesh size or smaller, and forming a battery including the positive electrode and a zinc electrode.

A nickel oxyhydroxide/zinc battery system can have improved retention of discharge performance after high temperature storage. By including fine zinc particles in the anode, good performance under both high and low drain conditions is obtained. By including carbon particles, such as graphite, in the cathode, the low energy density normally attributed to this material can be compensated. Advantageously, the combination of an anode including fine zinc particles and a cathode including nickel oxyhydroxide, that can further include graphite, provides good performance characteristics after storage. Specifically, addition of fine zinc particles to the anode of a nickel oxyhydroxide/zinc battery improves performance under both high and low drain conditions after extended storage at elevated temperature. By combining fine zinc particles in an anode and nickel oxyhydroxide with graphite in a cathode, improved stability and improved discharge performance of the battery can be obtained without needing to modify the anode or cathode in other ways, such as by modifying the specific compositions or introducing other additives or dopants.

The improvement in discharge performance can result from improved conductivity between fine zinc particles and the current collector. Unexpectedly, when fine zinc particles are used in a cell including nickel oxyhydroxide as the active cathode material, the low rate discharge performance also is improved. The performance improvements can occur without substantially changing the total capacity of the cell.

Moreover, including a relatively high level of graphite in a cathode including nickel oxyhydroxide leads to improved performance after extended storage at elevated temperatures. Inclusion of a higher graphite level or a more effective conductive agent, for example, an electrically conductive metal oxide, such as antimony-tin oxide, indium-tin oxide, tin oxyfluoride, indium oxyfluoride or combinations thereof, can improve the discharge performance of a nickel oxyhydroxide-based alkaline cell more than that of a manganese dioxide-based alkaline cell. The improvement in performance resulting from higher graphite levels is most apparent during continuous discharge under high drain conditions.

Other features and advantages of the invention will be apparent from the description and drawing, and from the claims.

DETAILED DESCRIPTION

Figure 1:
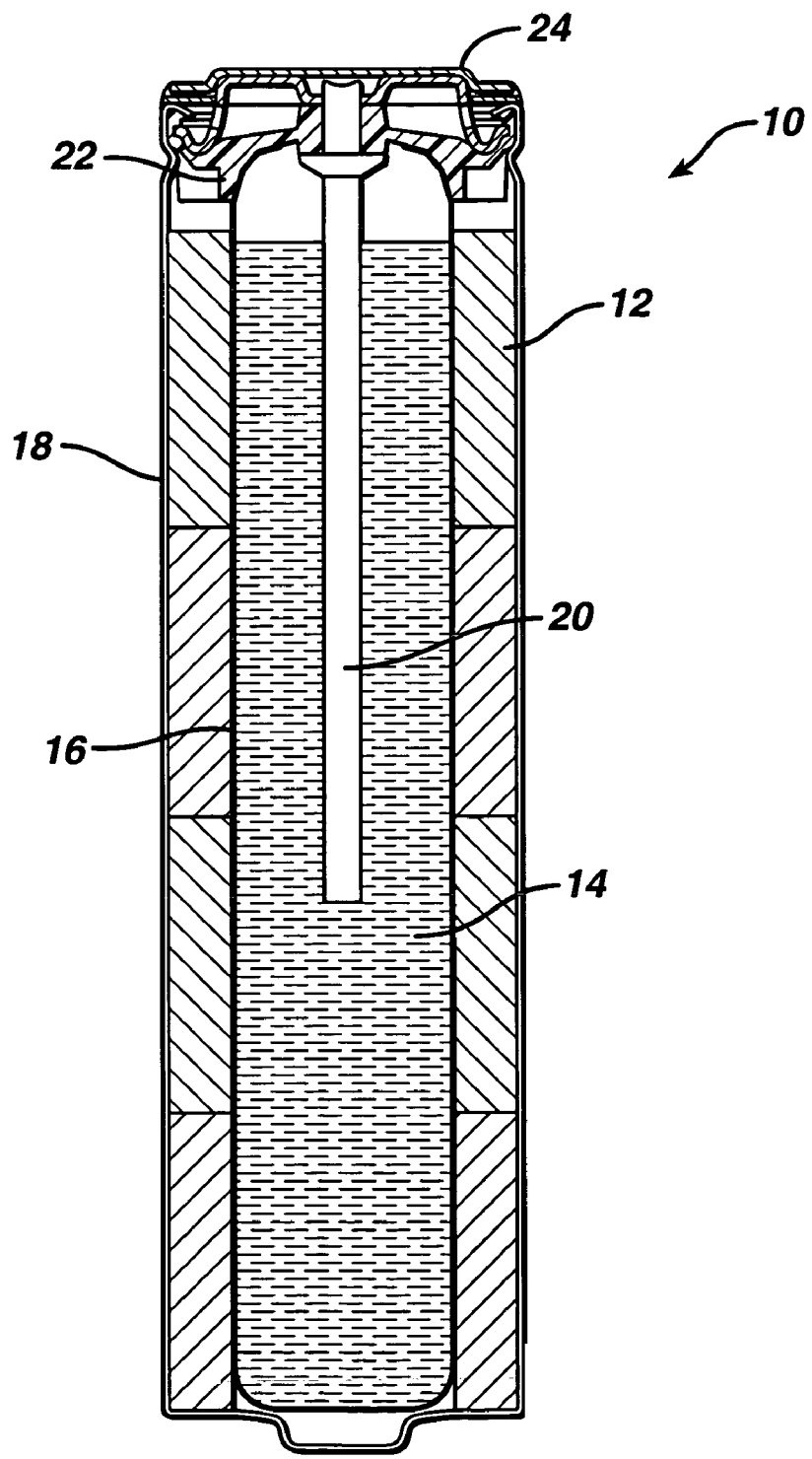
FIG. 1 is a cross-section view of a battery.

Referring to FIG. 1, battery 10 includes a cathode 12 (positive electrode), an anode 14 (negative electrode), a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C or D or a battery. Alternatively, battery 10 can be a prismatic, laminar or thin battery, a coin cell or a button cell.

Anode 14 can be formed of any of the materials conventionally used in zinc battery anodes. For example, anode 14 can be a zinc slurry that can include zinc metal particles, a gelling agent, and minor amounts of additives, such as a gassing inhibitor. In addition, a portion of the electrolyte solution can be dispersed throughout the anode.

The zinc particles can be any of the zinc particles conventionally used in zinc slurry anodes. The anode can include, for example, between 60 wt % and 80 wt %, between 65 wt % and 75 wt %, or between 67 wt % and 71 wt % of zinc particles. The zinc particles can be small zinc-based particles, such as zinc fines or zinc dust. A zinc-based particle can be formed of, for example, zinc or a zinc alloy. Preferred zinc-based particles are essentially mercury-free and lead-free. Metals that can be alloyed with zinc to provide zinc-based particles preferably include those that can inhibit gassing, such as indium, bismuth, aluminum, and mixtures thereof. As used herein, gassing refers to the evolution of hydrogen gas resulting from a reaction of zinc metal with the electrolyte. The presence of hydrogen gas inside a sealed battery is undesirable because a pressure buildup can cause leakage of electrolyte. Generally, a zinc-based particle formed of a zinc alloy is greater than 75 at % zinc. A zinc-based particle can be formed by manufacturing processes including gas atomization, melt spinning, and air blowing.

Zinc fines are zinc-based particles that have dimensions suitable to pass through a standard 200 mesh screen (i.e., −200 mesh) in a normal sieving operation, such as when a sieve is shaken by hand. Zinc dust contains zinc-based particles that have dimensions suitable to pass through a standard 325 mesh screen (i.e., −325 mesh) in a normal sieving operation. The zinc-based particles can be nominally spherical or nonspherical in shape. Nonspherical particles can be acicular in shape (i.e., having a length along a major axis at least two times a length along a minor axis) or flake-like in shape (i.e., having a thickness no more than 20 percent of the maximum linear dimension).

Particle-to-particle interactions among the zinc-based particles of the anode can provide good cell performance characteristics, especially those characteristics related to discharge performance, for example, under high drain conditions. This is particularly evident when the cathode includes nickel oxyhydroxide. It is believed that the particle-to-particle connectivity between large zinc-based particles and zinc fines and dust is improved resulting in higher electrical conductivity at weight percentages of fine zinc particles of 50% or less. Improved connectivity also can produce an increase in resistance to movement or yield point of the zinc anode slurry, thereby providing improved tolerance for mechanical shock including decreased tap load voltage instability and increased drop voltage stability for batteries including such zinc-based particles. See, for example, U.S. Pat. No. 6,284,410, which is incorporated by reference in its entirety.

The zinc-based particles can have a multi-modal distribution, such as a bi-modal distribution, of zinc-based particles in terms of particle size, particle morphology and/or particle composition. A multi-modal distribution refers to a distribution having at least two distinct peaks. For example, a plot of the relative percentage of particles as a function of particle size for zinc-based particles having a multi-modal distribution of particle sizes would have at least two distinct peaks. For zinc-based particles having a multi-modal distribution of particle sizes, each mode has a different average or mean particle size. For example, in a bi-modal distribution of particle sizes, one mode can have a relatively small average particle size (e.g., zinc fines or zinc dust), while the other mode can have a larger average particle size. Size distributions of the zinc-based particles can be determined in the manner disclosed in U.S. Pat. No. 6,284,410.

For zinc-based particles having a multi-modal distribution of particle sizes, for example, one of the modes can have an average particle size of from 15 microns to 120 microns, from 30 microns to 40 microns or from 95 microns to 105 microns.

For zinc-based particles in a mode having an average particle size between about 30 microns and 40 microns, at least 90 volume percent of the zinc-based particles can have a particle size between about 5 microns and 100 microns, and at least 75 volume percent of the zinc-based particles can have a particle size between about 15 microns and 75 microns. For zinc-based particles in a mode having an average particle size of between about 95 microns and 105 microns, at least 90 volume percent of the zinc-based particles can have a particle size between about 15 microns and 200 microns, and at least 75 volume percent of the zinc-based particles can have a particle size between about 25 microns and 140 microns. Another mode of the zinc-based particles can have an average particle size between about 200 microns and 330 microns. For example, the average particle size of this mode can be between about 290 microns and 300 microns. For this mode, at least 90 volume percent of the particles can have a particle size between about 50 microns and 850 microns, and at least 75 volume percent of the particles can have a particle size between about 100 microns and 550 microns.

For zinc-based particles having a multi-modal distribution of particle morphologies, more than one mode can be formed of nonspherical particles, with each mode being more or less nonspherical than other modes. Alternatively, one mode can be formed of nominally spherical zinc-based particles, while another mode can be formed of nonspherical particles, for example, flake-like or acicular particles.

For zinc-based particles having a multi-modal distribution of particle compositions, one mode can be formed of zinc-based particles of one composition, while another mode can be formed of zinc-based particles of another composition. For example, one mode can include zinc-based particles formed of zinc and a certain amount of one or more metals that can inhibit gassing such as, for example, bismuth and indium, whereas another mode can include zinc-based particles formed of zinc and a different amount of one or more metals that can inhibit gassing such as, for example, bismuth and indium.

For zinc-based particles having a multi-modal distribution of particle compositions, one mode can include zinc-based particles formed of zinc, 500 parts per million (ppm) indium relative to zinc and 500 ppm bismuth relative to zinc. Alternatively, this mode can include zinc-based particles formed of zinc, 350 ppm indium relative to zinc and 150 ppm bismuth relative to zinc. For zinc-based particles having a multi-modal distribution of particle compositions, yet another mode can include zinc-based particles formed of zinc, 150 ppm indium relative to zinc and 230 ppm bismuth relative to zinc.

The zinc-based particles can include as little as 1% by weight to 10% by weight of zinc fines. Alternatively, the zinc-based particles can include at least 10% by weight, preferably at least 50% by weight, and more preferably at least 80% by weight zinc fines. In some embodiments, 100% by weight of the zinc-based particles can be zinc fines. High performance also has been obtained, as described more fully below, when there is a significant proportion of zinc-based particles in the form of zinc dust in the anode.

The average size of the zinc-based particles can be relatively small. Preferably, the zinc-based particles have an average size of less than about 175 microns, more preferably less than about 150 microns, and most preferably less than about 120 microns. The manner in which the average particle size of the zinc-based particles is determined is discussed below.

One of the effects of including significant proportions of very small zinc-based particles is an increase in the bulk surface area (i.e., the aggregate surface area) of the zinc-based particles in the anode. This is due to the inherent relationship between particle surface area and particle volume: namely that, for particles of similar shape, decreasing the average particle size increases the average surface area to volume ratio of the particles. Specific surface areas of zinc-based particles can be determined from multipoint nitrogen adsorption isotherms measured by the B.E.T. method as described, for example, by P. W. Atkins (See "Physical Chemistry", $5^{th}$ ed., New York: W. H. Freeman & Co., 1994, pp. 990–2). A high measured specific surface area for a given mass of particles is offered as a possible partial explanation for the substantially improved performance demonstrated by batteries having anodes including zinc-based particles in the form of zinc fines.

Particle bulk surface area can be further enhanced by controlling the production process or subsequent processing of the zinc-based particles to produce particles with extended, nonspherical shapes, such as flake-like or acicular particles. Suitable acicular shapes can have a length $L_1$ along a major axis at least two times a length $L_2$ along a minor axis. Flake-like particles can have a thin cross-section and two broad, opposite sides. Preferably, such a flake-like particle has an average thickness between its broad sides of no more than 20% of the maximum dimension of the particle, thereby resulting in a very low volume to surface area ratio. See, for example, U.S. Pat. No. 6,284,410.

Zinc-based particles having the desired distribution of particle sizes can be produced by various manufacturing processes. For instance, standard mesh sieves can be employed to sort zinc-based particles produced by centrifugal atomization, gas atomization, or any other known method for preparing fine zinc particles. Once the zinc-based particles are sorted, by sieving or air classification, for example, various size ranges of particles can be mixed in proper proportions to produce the desired particle size distribution. Alternatively, the average particle size, as produced, can be controlled as well as the particle size distribution, to produce a statistical distribution of particle sizes including a significant proportion of zinc fines and zinc dust. Once formed, the zinc-based particles can be further mixed with surfactants, gassing inhibitors, gelling agents, electrolyte, and other performance-enhancing additives employing standard mixing processes.

The electrolyte can be an aqueous solution of an alkali metal hydroxide, such as potassium hydroxide, sodium hydroxide, lithium hydroxide or mixtures thereof. The electrolyte can contain between 15 wt % and 60 wt %, between 20 wt % and 55 wt %, or between 30 wt % and 50 wt % of the alkali metal hydroxide dissolved in water. The electrolyte can contain from 0 wt % to 6 wt % of a metal oxide, such as zinc oxide. The addition of electrolyte to the cell can be assisted by application of vacuum to the cell, thereby assisting electrolyte penetration into the cathode and separator. Application of vacuum during assembly can improve cell performance.

Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. Examples of a polyacrylic acid include CARBOPOL 940 and 934 (available from B. F. Goodrich) and POLYGEL 4P (available from 3V), and an example of a grafted starch material includes WATERLOCK A221 or A220 (available from Grain Processing Corporation, Muscatine, Iowa). An example of a salt of a polyacrylic acid includes ALCOSORB G1 (available from Ciba Specialties). The anode can include, for example, between, between 0.05 wt % and 2 wt %, or between 0.1 wt % and 1 wt % gelling agent.

A gassing inhibitor can include a metal, such as bismuth, tin, indium or a mixture or alloy thereof. A gassing inhibitor also can include an inorganic compound such as a metal salt, for example, an indium or bismuth salt or a mixture thereof. Alternatively, a gassing inhibitor can include an organic compound, such as a phosphate ester, an ionic surfactant or a nonionic surfactant. Examples of suitable ionic surfactants are disclosed in, for example, U.S. Pat. No. 4,777,100, which is hereby incorporated by reference in its entirety.

Separator 16 can be a conventional battery separator. In some embodiments, separator 16 can be formed of two layers of non-woven, non-membrane material with one layer being disposed along a surface of the other. For example, to minimize the volume of separator 16 while providing an efficient battery, each layer of non-woven, non-membrane material can have a basic weight of 54 grams per square meter, a thickness of 5.4 mils when dry and a thickness of 10 mils when wet. The layers can be substantially devoid of fillers, such as inorganic particles.

In other embodiments, separator 16 can include a layer of cellophane combined with a layer of non-woven material. The separator also can include an additional layer of non-woven material. The cellophane layer can be adjacent to cathode 12 or anode 14. The non-woven material can contain from 78 wt % to 82 wt % polyvinyl alcohol and from 18 wt % to 22 wt % rayon with a trace amount of a surfactant, such as non-woven material available from PDM under the trade name PA25.

Housing 18 can be a conventional battery housing fabricated from metal, such as, for example, nickel-plated cold-rolled steel, commonly used for primary alkaline batteries. The housing can include an inner metal wall and an outer electrically non-conductive material such as a heat shrinkable plastic. Optionally, a layer of conductive material can be disposed between the inner wall and cathode 12. The layer can be disposed along the inner surface of the inner wall, along the circumference of cathode 12, or both. The conductive layer can be formed, for example, of a carbonaceous material (e.g., colloidal graphite), such as LB1000 (Timcal), Eccocoat 257 (W. R. Grace & Co.), Electrodag 109 (Acheson Colloids Company), Electrodag EB-009 (Acheson), Electrodag 112 (Acheson) and EB0005 (Acheson). Methods of applying the conductive layer are disclosed in, for example, Canadian Patent No. 1,263,697, which is hereby incorporated by reference in its entirety.

Anode current collector 20 passes through seal 22 extending into anode 14 and can be made from a suitable metal, such as brass. The upper end of current collector 20 electrically contacts negative metal top cap 24. Seal 22 can be made, for example, of nylon.

Cathode 12 is an annular structure having an outer surface in electrical contact with the inner surface of housing 18, which also serves as the positive external battery terminal.

Cathode 12 can be formed by stacking multiple smaller pellets. Cathode 12 includes an active cathode material and conductive carbon particles. Optionally, cathode 12 can also include an oxidative additive, or a binder, or both. Generally, the cathode can include, for example, between 60% by weight and 97% by weight, between 80% by weight and 95% by weight or between 85% by weight and 90% by weight of active cathode material. The active cathode material can be nickel oxyhydroxide. Optionally, cathode 12 can include a mixture of two active cathode materials, for example, nickel oxyhydroxide and gamma-manganese dioxide (i.e., electrolytically produced manganese dioxide or chemically produced manganese dioxide).

The conductive carbon particles can include graphite particles. The graphite particles can be synthetic graphite particles, including expanded graphite and non-synthetic or natural graphite, or a blend thereof. Natural graphite particles can have average particle sizes ranging from about 2 to 50 microns. Suitable graphite particles can be obtained from, for example, Brazilian Nacional de Grafite of Itapecerica, MG Brazil (e.g., NdG grade MP-0702X) Chuetsu Graphite Works, Ltd. (e.g., Chuetsu grades WH-20A and WH-20AF) of Japan or Timcal America of Westlake, Ohio (e.g., Timcal grade EBNB-90). Cathode 12 can include, for example, between 3 wt % and 12 wt %, between 4 wt % and 10 wt % or between 6 wt % and 8 wt % of graphite particles or a blend of graphite particles. For cathodes containing lower levels of graphite (e.g., <10 wt %), a portion of the graphite ranging from 10 to 90%, from 25 to 75%, or from 40 to 60% by weight can be expanded graphite. Expanded graphite particles can have average particle sizes ranging from 0.5 to 40 microns.

Examples of binders can include a polymer such as polyethylene, polypropylene, polyacrylamide, or a fluorocarbon resin, such as, for example, polyvinylidene difluoride or polytetrafluoroethylene. A suitable polyethylene binder is sold under the trade name COATHYLENE HA-1681 (available from Hoechst). The cathode can include, for example, between 0.05 wt % and 5 wt %, or between 0.1 wt % and 2 wt % of binder.

A portion of the electrolyte solution can be dispersed throughout cathode 12, and the weight percentages provided above and below are determined after the electrolyte solution has been so dispersed.

The nickel oxyhydroxide can be prepared by a variety of synthetic methods. For example, nickel oxyhydroxide can be prepared by combining a nickel hydroxide and an alkali hydroxide salt in an inert atmosphere to form a mixture. The mixture can be exposed to ozone to form a nickel oxyhydroxide. The ozone can be mixed with dioxygen and can include enough water to initiate the oxidation process. Excessive amounts of water in the treatment gas can cause the powder to agglomerate. The mixture can be exposed to ozone for less than twelve hours, for example, less than six hours or less than four hours, to produce a nickel oxyhydroxide that contains little or no nickel hydroxide.

For example, a mixture of nickel hydroxide and alkali hydroxide salt can be oxidized via ozonation at a temperature between 10 and 80° C. or between 15 and 50° C. to provide a nickel oxyhydroxide. The temperature of the mixture can be maintained within a ten degree range during ozonation. The mixture of nickel hydroxide and alkali hydroxide salt can be formed by manual or mechanical grinding of an alkali hydroxide salt, such as potassium hydroxide or sodium hydroxide pellets into a powder or by manual or mechanical mixing of nickel hydroxide and a pre-ground alkali hydroxide salt, and loading of the mixture into the reaction vessel. The nickel hydroxide and alkali hydroxide salt can be mixed in a dry, air-free atmosphere. The dry, air-free atmosphere can be essentially free from carbon dioxide and water. For example, the dry, air-free atmosphere can be an inert gas. Suitable inert gases include nitrogen, argon, and helium. The mixture of nickel hydroxide and alkali hydroxide salt can be exposed to ozone gas in a reaction vessel designed to minimize infiltration of air into the reaction vessel during the treatment with ozone gas. A suitable reaction vessel is disclosed in co-pending U.S. application Ser. No. 10/086,807, filed Mar. 4, 2002, which is incorporated by reference in its entirety.

The nickel hydroxide can be oxidized to nickel oxyhydroxide by a variety of solution oxidation methods including, for example, treatment with a basic aqueous solution of sodium or potassium hypochlorite or an aqueous solution of sodium or potassium peroxydisulfate. The nickel hydroxide also can be oxidized to nickel oxyhydroxide electrolytically.

A suitable nickel hydroxide consists of particles that are approximately spherical in shape (i.e., the outer surfaces of the particles approximate spheres, spheroids or ellipsoids). The nickel hydroxide can include a beta-nickel hydroxide, a cobalt hydroxide-coated beta-nickel hydroxide, an alpha-nickel hydroxide, a cobalt hydroxide-coated alpha-nickel hydroxide and mixtures thereof. Suitable nickel hydroxides can be obtained from, for example, H. C. Starck GmbH & Co. (Goslar, Germany), Tanaka Chemical Co. (Fukui, Japan), Kansai Catalyst Co., Ltd. (Osaka, Japan) or Umicore Canada Inc. (Leduc, Alberta).

Nickel oxyhydroxide can have average particle sizes ranging from, for example, 5 to 30 microns, 10 to 25 microns or 15 to 20 microns. The nickel oxyhydroxide can include a beta-nickel oxyhydroxide, a cobalt oxyhydroxide-coated beta-nickel oxyhydroxide, a gamma-nickel oxyhydroxide, or a cobalt oxyhydroxide-coated gamma-nickel oxyhydroxide, or mixtures thereof. Cobalt oxyhydroxide-coated nickel oxyhydroxide particles include a cobalt oxyhydroxide coating that can enhance inter-particle electrical contact between nickel oxyhydroxide particles in the cathode. The cobalt oxyhydroxide coating can cover, for example, at least 60%, at least 70%, at least 80% or at least 90% of the surface of the nickel oxyhydroxide particle. Cobalt oxyhydroxide-coated nickel oxyhydroxide can be prepared from nickel hydroxide coated with between 2% and 15%, preferably between 3% and 10% or between 4% and 6% by weight of cobalt hydroxide. Suitable cobalt oxyhydroxide-coated nickel oxyhydroxides also can be obtained from, for example, Tanaka Chemical Co. (Fukui, Japan), Kansai Catalyst Co., Ltd. (Osaka, Japan), H. C. Starck GmbH & Co. (Goslar, Germany), and Umicore Canada Inc. (Leduc, Alberta).

The following examples relate to alkaline primary batteries including a cathode including nickel oxyhydroxide and carbon particles, and an anode including fine zinc particles.

EXAMPLES

Cells were prepared in cylindrical graphite-coated AA-size nickel-plated cold-rolled steel steel cans (13.7 mm O.D.×47.3 mm H). The graphite included in the cathode mixture was a NdG grade natural graphite having a $D_{50}$ particle size of about 7 microns obtained from Brazilian Nacional de Grafite. The nickel oxyhydroxide active cathode material was a cobalt oxyhydroxide-coated beta-nickel oxyhydroxide having a $D_{50}$ particle size of about 16 microns obtained from Kansai Catalyst Co., Ltd. (Osaka, Japan). The cobalt oxyhydroxide-coated beta-nickel oxyhydroxide had the following nominal chemical composition: NiOOH 90.2 wt %; CoOOH 6.6 wt %, NaOH 1.5 wt %, moisture 1.6 wt %. Two slightly different cathode formulations used to prepare mixtures for the fabrication of cathodes for the batteries of the Examples are designated as formulation A and formulation B and are given in Table 1.

TABLE 1

| Component | Formulation A (wt %) | Formulation B (wt %) |
|---|---|---|
| NiOOH | 87 | 85 |
| Graphite | 6 | 8 |
| Polyethylene Binder | 1 | 1 |
| KOH Solution (7N) | 6 | 6 |

Two different anode formulations were used to prepare anode slurries for the batteries of the Examples. The formulations in which one contained only relatively large zinc particles and the other contained 50 wt % zinc fines are designated as formulation A and formulation B, respectively and are given in Table 2.

TABLE 2

| Component | Formulation A (wt %) | Formulation B (wt %) |
|---|---|---|
| Large Particle Zinc (−20/+200 mesh) | 64 | 32 |
| Fine Zinc (−325 mesh) | 0 | 32 |
| Indium acetate | 0.029 | 0.029 |
| 3% solution of RM R510 | 0.107 | 0.107 |
| CARBOPOL 940 | 0.522 | 0.522 |
| Electrolyte (aqueous 38 wt % KOH and 2 wt % ZnO) | 35.306 | 35.306 |
| Waterlock A221 | 0.0036 | 0.036 |

Batteries containing anode formulation A and batteries containing anode formulation B were prepared. The batteries having anode formulation A also included cathode formulation A with 6 wt % graphite in the cathode. The batteries having anode formulation B also included cathode formulation B with 8 wt % graphite in the cathode. The effect of the two different anode formulations on discharge performance properties was evaluated for freshly prepared batteries, and for batteries that had been stored for one week at 60° C.

In a constant load test, a constant resistance of 3.9 ohms was applied across the battery terminals and the battery was continuously discharged through the load. The amount of time from the application of the load to when the battery voltage dropped to a predetermined cut-off voltage was recorded. In one pulse test (i.e., 1.0 Watt, 10 sec/min-1 hr/6 hr), a controlled 1.0 Watt load was applied intermittently to the battery in a series of pulses, each of 10 seconds duration with a 50 second pause in between each pulse. The pulse series was continued for a period of one hour every 6 hours until the battery voltage dropped to a predetermined cut-off voltage, at which point the service life was recorded. In another pulse test (i.e., 1.0/0.1 Watt, 3 sec/7 sec), a controlled 1.0 Watt load was applied intermittently to the battery in a series of pulses, each of 3 seconds duration with a 4 second pause in between each pulse during which time the controlled load was reduced to 0.1 Watt. The pulse series was continued until the battery voltage dropped to a prede termined cut-off voltage, at which point the service life was recorded. The test results are summarized in Table 3.

TABLE 3

| | Service Hours | | |
|---|---|---|---|
| Test | Formulation A | Formulation B | % Gain |
| Fresh | | | |
| 1.0 Watt Continuous 1.0 v | 1.2 | 1.31 | 9.2 |
| 1.0 Watt Continuous 0.9 v | 1.2 | 1.31 | 9.2 |
| 1.0/0.1 Watt 3s/7s 1.0 v | 5.93 | 6.24 | 5.2 |
| 1.0/0.1 Watt 3s/7s 0.9 v | 5.95 | 6.28 | 5.5 |
| 1.0 Watt 10 s/m-1 hr/6 hr 1.0 v | 1.75 | 2.45 | 40.0 |
| 1.0 Watt 10 s/m-1 hr/6 hr 0.9 v | 1.83 | 2.48 | 35.5 |
| 1 Week @ 60 C | | | |
| 1.0 Watt Continuous 1.0 v | 0.62 | 1.16 | 87.1 |
| 1.0 Watt Continuous 0.9 v | 0.62 | 1.18 | 90.3 |
| 1.0/0.1 Watt 3s/7s 1.0 v | 2.57 | 4.82 | 87.5 |
| 1.0/0.1 Watt 3s/7s 0.9 v | 2.58 | 4.85 | 88.0 |
| 1.0 Watt 10 s/m-1 hr/6 hr 1.0 v | 1.2 | 2.02 | 68.3 |
| 1.0 Watt 10 s/m-1 hr/6 hr 0.9 v | 1.28 | 2.07 | 61.7 |

The batteries containing anode formulation B, including 50 wt % zinc fines and cathode formulation B including 8 wt % graphite, provided superior performance in all tests for both cutoff voltages, fresh and after storage for 1 week at 60° C. In particular, the percentage improvement was most apparent for batteries that were stored 1 week at 60° C. In this case, the percentage improvement was more apparent for the continuous constant load (i.e., current) test and the nearly continuous 1.0 Watt short pulse test (i.e., 1.0/0.1 Watt, 3 sec/7 sec) than for the other pulse test having longer duration pulses and longer pauses between pulses. However, in the case of the batteries discharged fresh, the greatest percentage improvement was obtained in the pulse test having longer duration pulses and longer pauses between pulses.

Other embodiments are within the claims.

What is claimed is:

1. An alkaline battery comprising:
    a cathode comprising an active cathode material including a nickel oxyhydroxide;
    an anode comprising zinc or zinc alloy particles, wherein between 35 and 75 wt % of the particles are of −200 mesh size or smaller;
    a separator between the anode and the cathode; and
    an alkaline electrolyte contacting the anode and the cathode.

2. The battery of claim 1, wherein the anode comprises zinc alloy particles including at least one metal selected from indium, bismuth, tin, or aluminum.

3. The battery of claim 1, wherein the nickel oxyhydroxide is a beta-nickel oxyhydroxide, a cobalt oxyhydroxide-coated beta nickel oxyhydroxide, a gamma-nickel oxyhydroxide, or a cobalt oxyhydroxide-coated gamma-nickel oxyhydroxide.

4. The battery of claim 1, wherein the nickel oxyhydroxide includes particles having outer surfaces that approximate spheres, spheroids or ellipsoids.

5. The battery of claim 4, wherein the nickel oxyhydroxide particles have an average particle size ranging from 10 to 25 microns.

6. The battery of claim 4, wherein the nickel oxyhydroxide particles have an average particle size ranging from 15 to 20 microns.

7. The battery of claim 1, wherein the cathode includes a mixture of nickel oxyhydroxide and gamma-manganese dioxide.

8. The battery of claim 1, wherein the cathode includes carbon particles.

9. The battery of claim 8, wherein the cathode includes between 3 wt % and 12 wt % carbon particles.

10. The battery of claim 8, wherein the cathode includes between 6 wt % and 10 wt % carbon particles.

11. The battery of claim 8, wherein the carbon particles include expanded graphite, natural graphite, or a blend thereof.

12. The battery of claim 8, wherein the carbon particles include natural graphite particles having a particle size ranging between 2 and 50 microns.

13. The battery of claim 8, wherein the carbon particles include expanded graphite particles having a particle size ranging between 0.5 and 30 microns.

14. The battery of claim 8, wherein the carbon particles include from 10 to 90% by weight natural graphite.

15. The battery of claim 8, wherein the carbon particles include from 10 to 90% by weight expanded graphite.

16. The battery of claim 1, wherein at least 45 wt % of the particles are of −325 mesh size or smaller.

17. The battery of claim 1, wherein the particles are generally acicular, having a length along a major axis at least two times a length along a minor axis.

18. The battery of claim 1, wherein the particles are generally flakes, each flake generally having a thickness of no more than 20 percent of the maximum linear dimension of the particle.

19. An alkaline battery comprising:
a cathode comprising graphite and an active cathode material including a nickel oxyhydroxide;
an anode comprising a multi-modal distribution of zinc or zinc alloy particles and wherein between 35 and 75 wt % of said zinc or zinc alloy particles are of −200 mesh size or smaller;
a separator between the anode and the cathode; and
an alkaline electrolyte contacting the anode and the cathode.

20. The battery of claim 19, wherein the cathode includes between 3 wt % and 12 wt % of graphite.

21. The battery of claim 19, wherein the cathode includes between 6 wt % and 10 wt % of graphite.

22. The battery of claim 20, wherein the graphite includes from 10 to 90% by weight natural graphite.

23. The battery of claim 20, wherein the graphite includes from 10 to 90% by weight expanded graphite.

24. The battery of claim 19, wherein at least 45 wt % of the particles are of −325 mesh size or smaller.

25. The battery of claim 19, wherein the particles are generally acicular, having a length along a major axis at least two times a length along a minor axis.

26. The battery of claim 19, wherein the particles are generally flakes, each flake generally having a thickness of no more than 20 percent of the maximum linear dimension of the particle.

27. A method of improving discharge performance after high temperature storage of an alkaline battery comprising:
providing a positive electrode including an active cathode material including nickel oxyhydroxide;
providing a zinc electrode including comprising zinc or zinc alloy particles, between 35 and 75 wt % of the zinc or zinc alloy particles are of −200 mesh size or smaller; and
forming a battery including the positive electrode and a zinc electrode.

28. The method of claim 27, wherein the cathode includes between 3 wt % and 12 wt % of graphite.

29. The method of claim 28, wherein the graphite includes from 10 to 90% by weight natural graphite.

\* \* \* \* \*